UNITED STATES PATENT OFFICE.

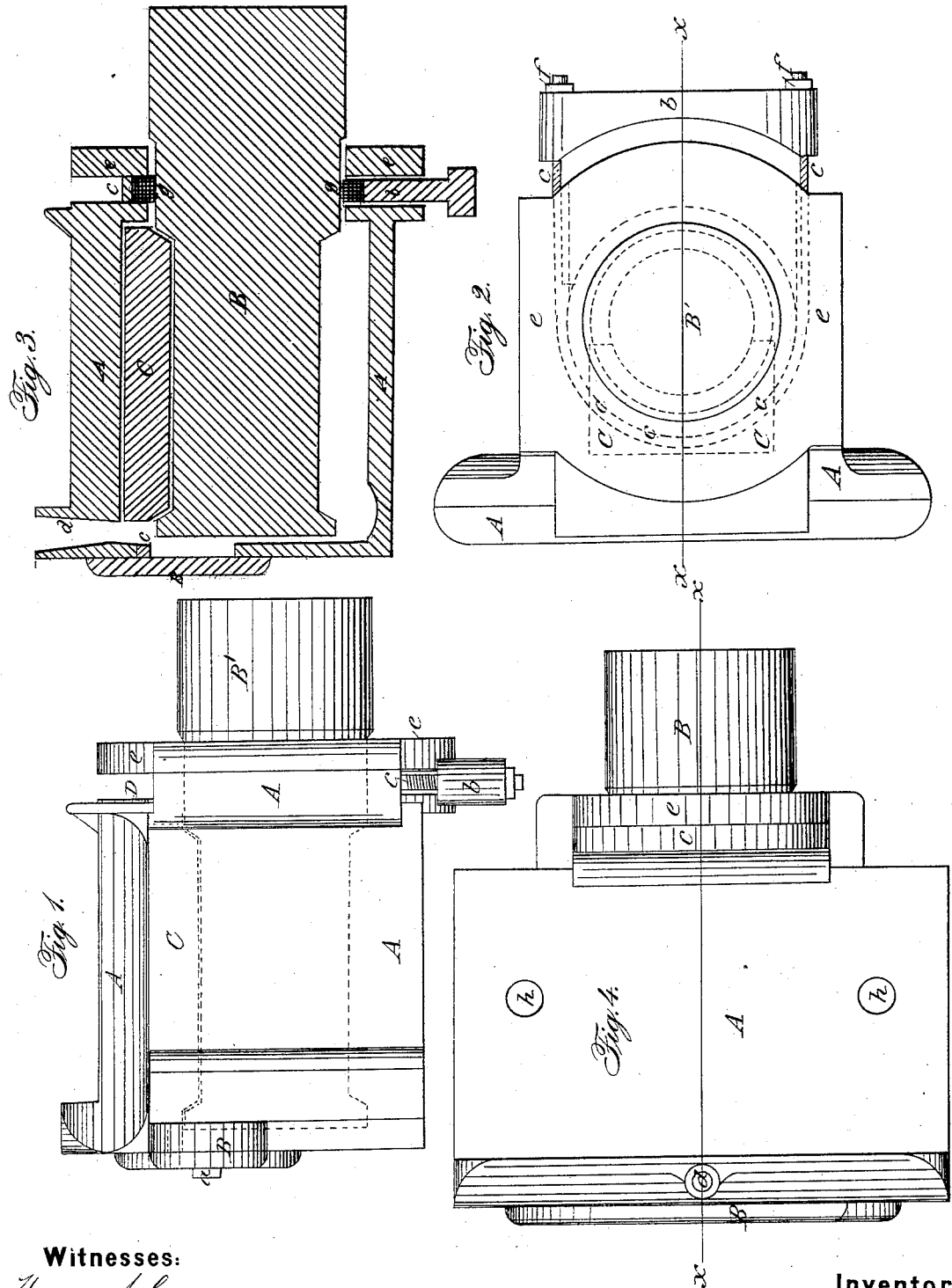

PHILIP UMHOLTZ, OF FREMONT, PENNSYLVANIA.

RAILROAD-CAR JOURNAL-BOX.

Specification of Letters Patent No. 23,279, dated March 15, 1859.

*To all whom it may concern:*

Be it known that I, PHILIP UMHOLTZ, of Fremont, county of Schuylkill, and State of Pennsylvania, have invented new and useful Improvements in Air-Tight Railroad-Car Journal-Boxes; and I do hereby declare that the following is a full, clear, and exact description thereof, reference being had to the accompanying drawings, and letters of reference marked thereon, in which—

Figure 1 is a side elevation. Fig. 2 is an end view. Fig. 3, is a vertical section through lines $x$, $x$ of Figs. 2 and 4. Fig. 4 is a plan view from the top of the invention.

The nature of my invention consists in the spring yoke bolt, and sliding clamp, for pressing the rubber disks closely around the journal, and operating in a mortise, as hereinafter described.

To enable others skilled in the art to make and use my invention, I will proceed to describe its construction and operation.

In the construction of my invention, in Fig. 1 A is the journal box, and is cast in one piece with the mortise in it, in which is placed the packing and yoke bolt. The door B is afterward attached to the end of the box by means of screws, $a$, in Fig. 1; B' the journal; C, the bearing against which the journal works, and which is slid into its place after the journal is set on, or fitted to its place; $c$ the spring yoke bolt, which is a spring yoke with a screw cut on each end, and passes down through the mortise D, around the packing $g$, seen in Fig. 3, the ends passing through the follower $b$, when the nuts $f$, are screwed on, and the packing can be made to fit tightly around the journal and prevent the escape of the oil.

In Figs. 1, 3 and 4, the outer portion of the box for forming the groove, is seen at $e$. In Fig. 4, $d$ is the oil hole. $h$, $h$ are holes for bolting the springs to the box. The other letters in said figure correspond with like parts in the other figures. In Fig. 2, which is an end view of my invention, A, is the box; $e$ that portion of the box forming the outside of the mortise; $b$ the follower; $c$ spring yoke bolt, and $f$ the nuts on the screws, or ends of the bolt. The yoke bolt is shown in dotted lines continuing around the washer $g$ in Fig. 3, and which washer is also shown in dotted lines. Around the journal formed each of half a circle, fitting closely to the journal, the follower is also seen, in dotted lines pressed close up to the packing until the packing meets at the point shown in dotted lines nearly vertical to the figure.

In the operation of my invention, it will be seen that by means of the spring yoke bolt, playing in the mortise D, the packing $g$, can be at all times made to fit up tightly around the journal thus making it air tight, and prevent the escape of the oil from the box.

If at any time the packing should wear away, all that is needed to tighten it is to turn the screws which push up the follower $b$ and press it up against the lower half of the packing, pressing it up tightly against the journal while the yoke part of the spring bolt rests on the upper part of the packing pressing it down tightly against the journal. While I in this way provide for tightening the packing, I at the same time allow for the play of the journal in all directions, by the play allowed, the yoke bolt, and follower in the mortise so that the journal is free to play in all directions, without at the same time causing the packing to get loose around the journal, as the packing is pressed against the journal as described, it is also pressed together, so as to fill the mortise, and prevent the oil escaping through the mortise thus making it air tight, and preventing the escape of oil.

Having thus described my invention, what I claim and desire to secure by Letters Patent is:

The spring yoke bolt $c$, in combination with the follower $b$ and packing, $g$, operating in mortise D of box A, in the manner described and for the purposes set forth.

P. UMHOLTZ.

Witnesses:
F. G. CLAYTON,
JOS. C. CLAYTON.